R. Street,
Leak Stopper for Hose and Pipes.
N° 98,893. Patented Jan. 18, 1870.
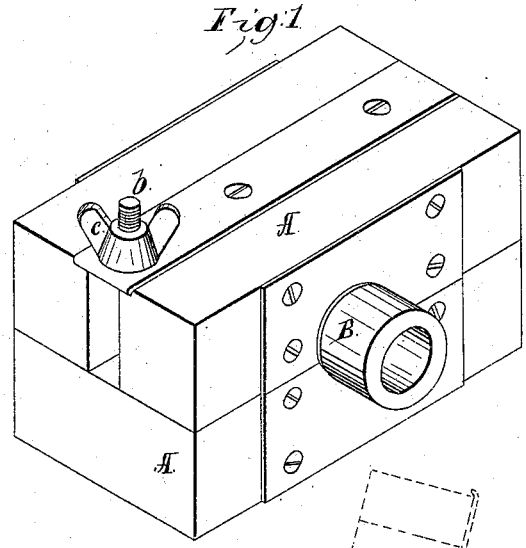
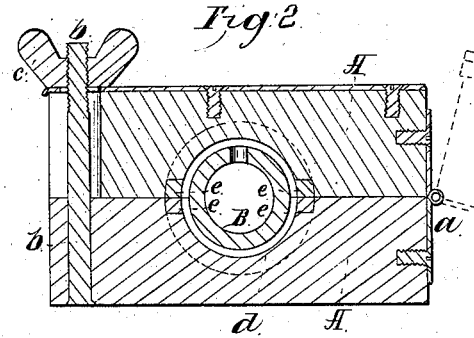
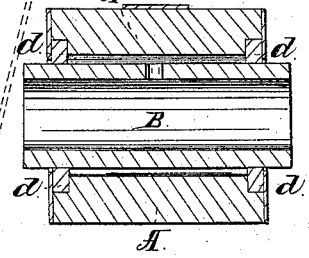
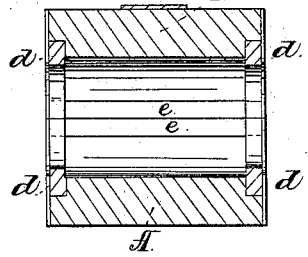
Witnesses
Thomas Silsby
Elijah Byxett
Inventor:
Richard Street

United States Patent Office.

RICHARD STREET, OF ALBANY, NEW YORK.

Letters Patent No. 98,893, dated January 18, 1870.

IMPROVEMENT IN CLOSING LEAKS IN HOSE, PIPES, AND TUBES.

The Schedule referred to in these Letters Patent and making part of the same.

I, RICHARD STREET, of Albany, in the county of Albany, State of New York, have invented an India-Rubber Pressure, of which the following is a specification.

The object of my invention is to repair hose, water, gas, steam, and other pipes, when bursted from internal pressure, or leaky from other causes.

Figure 1 is a perspective view of an apparatus or clamp embodying my invention.

Figure 2 is a longitudinal section of the same.

Figure 3 is a transverse section of the same, with a piece of hose or pipe inserted therein.

Figure 4 is a transverse section of the same, with the hose or pipe removed.

A is a clamp, made of hard wood, or other substantial material, constructed in two parts, and connected at one end by a hinge or hinges, $a$, and secured at the other end by a bolt, $b$, and nut $c$, or any other equivalent device.

This clamp is bored out in the centre, to fit the size of the hose or pipe desired to be repaired.

The hole thus bored out is lined at each end, and on the sides, where the parts of the clamp meet, with projecting strips of India rubber, $d$ and $e$, which strips are firmly attached to the body of the clamp, and in such a manner that when the burst or leaky hose or pipe B is encircled, and the clamp closed and securely fastened, they press so tightly against the sides of the hose or pipe, that no water, gas, steam, or air can escape.

These India-rubber strips $d$ and $e$ are made and put in, in such a manner that when the clamp A is open, as shown by dotted lines in fig. 2, they project slightly above its inner face, so that when it is closed and securely fastened, they, the strips $d$ and $e$, may be tightly compressed together, and form an air-tight joint.

Claim.

I claim, as my invention, the combination of India-rubber projecting strips, with a clamp, substantially as and for the purpose hereinbefore set forth.

RICHARD STREET.

Witnesses:
    THOMAS SILSBY,
    ELIJAH DYGERT.